(12) United States Patent
Hattori et al.

(10) Patent No.: US 9,680,145 B2
(45) Date of Patent: Jun. 13, 2017

(54) PRISMATIC SECONDARY BATTERY

(71) Applicant: SANYO Electric Co., Ltd., Moriguchi-shi, Osaka (JP)

(72) Inventors: Takayuki Hattori, Hyogo (JP); Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 427 days.

(21) Appl. No.: 14/192,249

(22) Filed: Feb. 27, 2014

(65) Prior Publication Data

US 2014/0242439 A1    Aug. 28, 2014

(30) Foreign Application Priority Data

Feb. 28, 2013 (JP) .................................. 2013-038540

(51) Int. Cl.
| | |
|---|---|
| *H01M 2/04* | (2006.01) |
| *H01M 2/30* | (2006.01) |
| *H01M 2/06* | (2006.01) |

(52) U.S. Cl.
CPC ............. *H01M 2/30* (2013.01); *H01M 2/043* (2013.01); *H01M 2/06* (2013.01); *H01M 2/305* (2013.01); *H01M 2220/20* (2013.01)

(58) Field of Classification Search
CPC ........ H01M 2/06; H01M 2/22; H01M 2/0434; H01M 2/04; H01M 2/0421; H01M 2/0469; H01M 2/1066
See application file for complete search history.

(56) References Cited

U.S. PATENT DOCUMENTS

| | | | |
|---|---|---|---|
| 8,241,786 B2* | 8/2012 | Taniguchi | H01M 2/305 429/178 |
| 9,225,001 B2* | 12/2015 | Hattori | H01M 2/30 |

FOREIGN PATENT DOCUMENTS

| | | |
|---|---|---|
| JP | 2003-045403 A | 2/2003 |
| JP | 2010-33766 A | 2/2010 |
| JP | 2010-277797 A | 12/2010 |
| JP | 2011-210482 A | 10/2011 |

(Continued)

OTHER PUBLICATIONS

JP2010-033766 English Translation 2010.*

(Continued)

*Primary Examiner* — Lucas J. O'Donnell
(74) *Attorney, Agent, or Firm* — Westerman, Hattori, Daniels & Adrian, LLP

(57) ABSTRACT

A prismatic nonaqueous electrolyte secondary battery includes a convex portion on a stepped portion of a stepped through hole of a positive electrode external conduction member. An upper end side of a caulked portion of a positive electrode terminal member is caulked by being inserted from a side of a small-diameter portion into the stepped through hole of a positive electrode external conduction member, and a convex portion of the positive electrode external conduction member is covered with a tip side of the caulked portion. Therefore, a terminal member and an external conduction member have a great bond strength, and rarely rotate with respect to each other. Thus, there is less concern that a conductivity decreases even when the battery is used under an environment including a lot of vibrations.

20 Claims, 8 Drawing Sheets

(56) References Cited

FOREIGN PATENT DOCUMENTS

JP        2013182724 A  *  9/2013

OTHER PUBLICATIONS

EN Translation of JP2010-277797A—2010.*
Office Action dated Jul. 28, 2016, issued in counterpart Japanese Patent Application No. 2013-038540, with English translation. (6 pages).

* cited by examiner

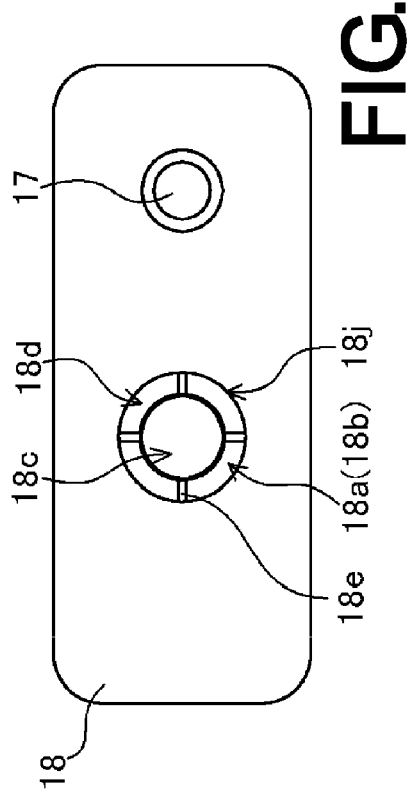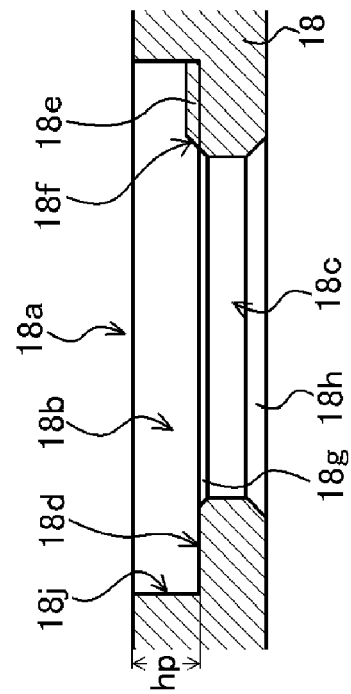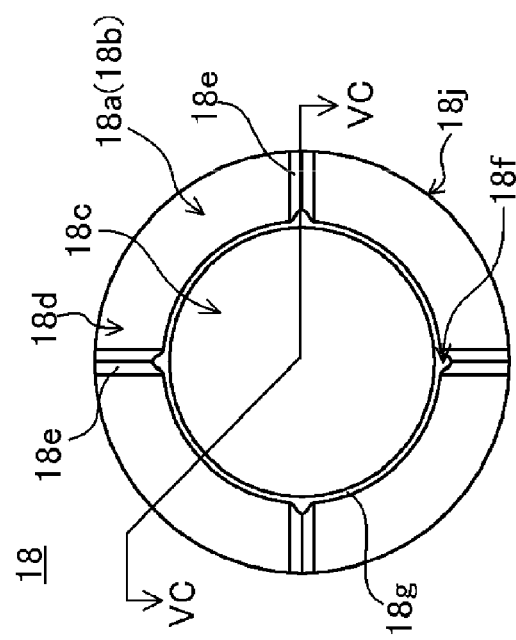
FIG. 5A
FIG. 5B
FIG. 5C

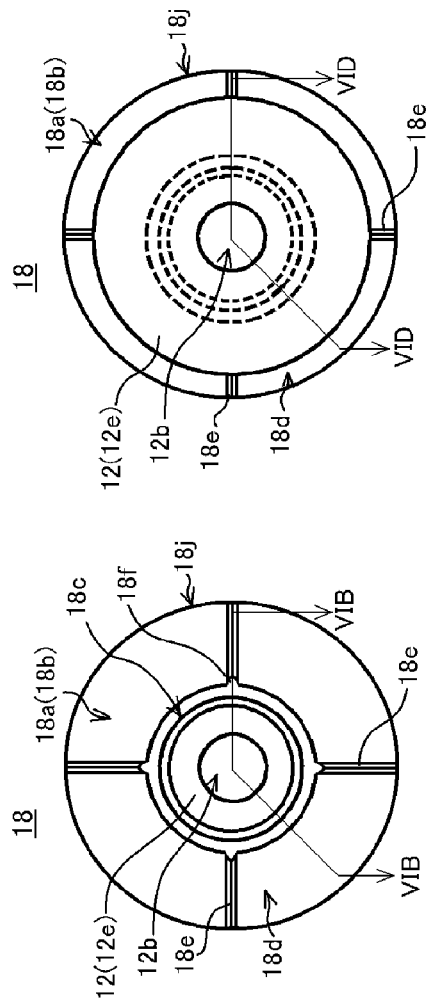
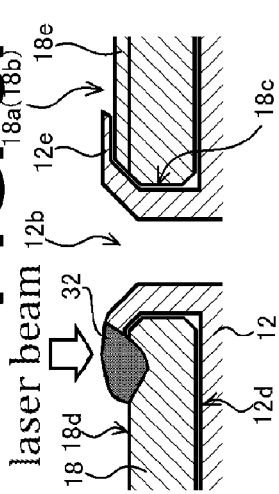

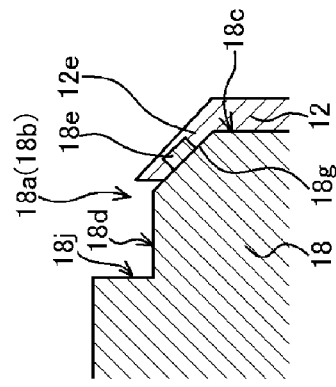 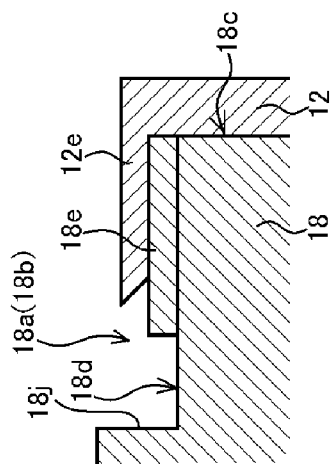 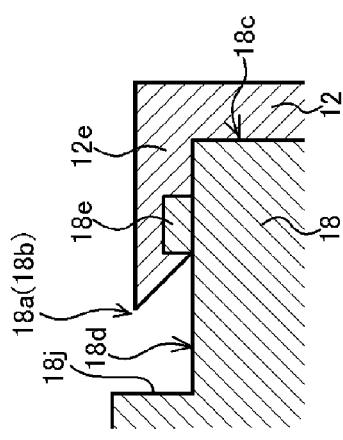
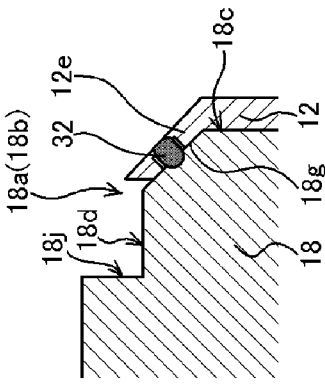 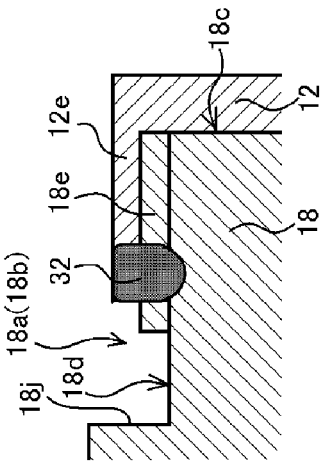 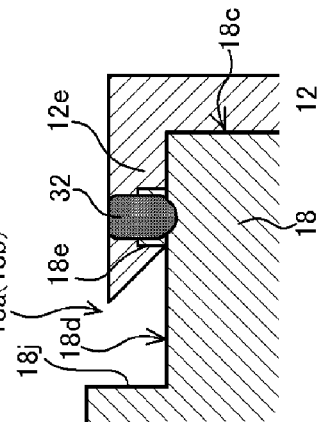
FIG. 8A  FIG. 8B  FIG. 8C
FIG. 8D  FIG. 8E  FIG. 8F

PRISMATIC SECONDARY BATTERY

TECHNICAL FIELD

The present invention relates to a prismatic secondary battery including a connecting portion in which a terminal member and an external conduction member are connected to each other by a caulked portion.

BACKGROUND ART

A drive power supply of an electrical vehicle (EV) and a hybrid electric vehicle (HEV and PHEV) requires a high capacity and a high output characteristic. Thus, each battery increases in size, and a large number of batteries are used by being connected to each other in series, in parallel, or in series-parallel. Prismatic secondary batteries are being widely used as the batteries in terms of space efficiency. The secondary prismatic batteries use a high-output battery in addition to an increased battery capacity. When a high output is discharged, a large current flows through a battery and thus, an internal resistance of the battery is needed to be lowered. For this reason, various improvements have been carried out with regard to realizing a reliability enhancement and a low resistance in a junction of a terminal member (a member passing through a sealing body) and an external conduction member (an external terminal board connected to the terminal member, a bus bar, and the like) to reduce an internal resistance of a battery as possible, and prevent a fluctuation of an internal resistance.

When only a mechanical caulking is merely used under an environment including a lot of vibrations of an EV, an HEV, a PHEV, and the like as a scheme of realizing a low resistance in the junction of the terminal member and the external conduction member of the batteries, there is a concern that an electric resistance changes over time. For this reason, as disclosed in JP 2010-033766 A, a boundary of the junction by caulking of the terminal member and the external conduction member is welded by a high energy ray such as a laser.

SUMMARY

According to a battery disclosed in JP 2010-033766 A, an internal resistance decreases, and an electric resistance rarely changes over time under an environment including a lot of vibrations of an EV, an HEV, a PHEV, and the like. Thus, a reliability enhancement and a low internal resistance can be realized in a junction of an inside of a battery and a terminal part. However, there is a desire for a development of a secondary battery having a higher reliability.

In particular, when an external conduction member corresponds to an external terminal board, and an external terminal board and a bus bar are connected to each other by a bolt fastening, a stress is applied to a welded part at the time of bolt fastening. For this reason, while the inventors proceed with a development, a problem that a conductivity between a terminal member and an external conduction member decreases occurs when a retightening of a bolt such as a restacking (after assembling a battery, disassembling and assembling the battery again) is performed.

A prismatic secondary battery of an aspect of the invention includes an electrode assembly including a positive electrode plate and a negative electrode plate, an outer body including an opening, and accommodating the electrode assembly, a sealing body including a through hole, and sealing the opening, an external conduction member including the through hole, placed outside the sealing body, and a terminal member electrically connected to the positive electrode plate or the negative electrode plate, and passing through the through hole of the sealing body, in which the terminal member includes a connecting portion, the connecting portion of the terminal member is inserted into the through hole of the external conduction member, and includes a tip caulked on the external conduction member, the external conduction member includes a convex portion for suppressing a rotation formed in a position facing the caulked connecting portion of the terminal member, and at least a portion of the convex portion is covered with the caulked portion.

In the prismatic secondary battery of an aspect of the invention, the convex portion for suppressing a rotation is joined to the caulked tip of the connecting portion of the terminal member and thus, the external conduction member rarely rotates. For this reason, according to the prismatic secondary battery of an aspect of the invention, even when the prismatic secondary battery is used under an environment including a lot of vibrations, a connecting part by caulking between the terminal member and the external conduction member is prevented from loosening, and a concern that a conductivity decreases is reduced. It is possible to use a bus bar as the external conduction member. In addition, when the external conduction member corresponds to the external terminal board, the external terminal board and the bus bar are connected to each other by a bolt fastening, and a retightening of a bolt is performed at the time of restacking, the conductivity between the terminal member and the external terminal board rarely decreases.

It is preferable that a plurality of convex portions formed with intervals be used as the convex portion for suppressing a rotation. In this case, a portion of at least one convex portion among the plurality of convex portions may be covered with the caulked portion. However, it is preferable that a portion of each of the plurality of convex portions be covered with the caulked portion. However, all the plurality of convex portions need not be covered with the caulked portion. When the convex portion is formed in an annular shape, a rotation suppressing effect is not obtained. Therefore, the convex portion is not included in the convex portion for suppressing a rotation.

BRIEF DESCRIPTION OF THE DRAWINGS

FIG. 5A is a plan view of a positive electrode external conduction member, FIG. 5B is an enlarged plan view of a part near a through hole of FIG. 5A, and FIG. 5C is an enlarged sectional view taken along line VC-VC of FIG. 5B;

FIG. 6A is a plan view of a state in which a connecting portion of a positive electrode terminal member is inserted into a through hole of a positive electrode external conduction member, FIG. 6B is a cross-sectional view taken along line VIB-VIB of FIG. 6A, FIG. 6C is a plan view of a state in which a spinning caulking is performed, FIG. 6D is a cross-sectional view taken along line VID-VID of FIG. 6C, FIG. 6E is a plan view after a laser welding is performed, and FIG. 6F is a cross-sectional view taken along line VIF-VIF of FIG. 6E;

FIGS. 8A to 8C are enlarged sectional views illustrating a bonding state of a positive electrode terminal member and a positive electrode external conduction member before a laser welding corresponding to Modified Examples 1 to 3, respectively, and FIGS. 8D to 8F are enlarged sectional views illustrating a bonding state of a positive electrode terminal member and a positive electrode external conduction member after a laser welding.

DETAILED DESCRIPTION

Figure 1:
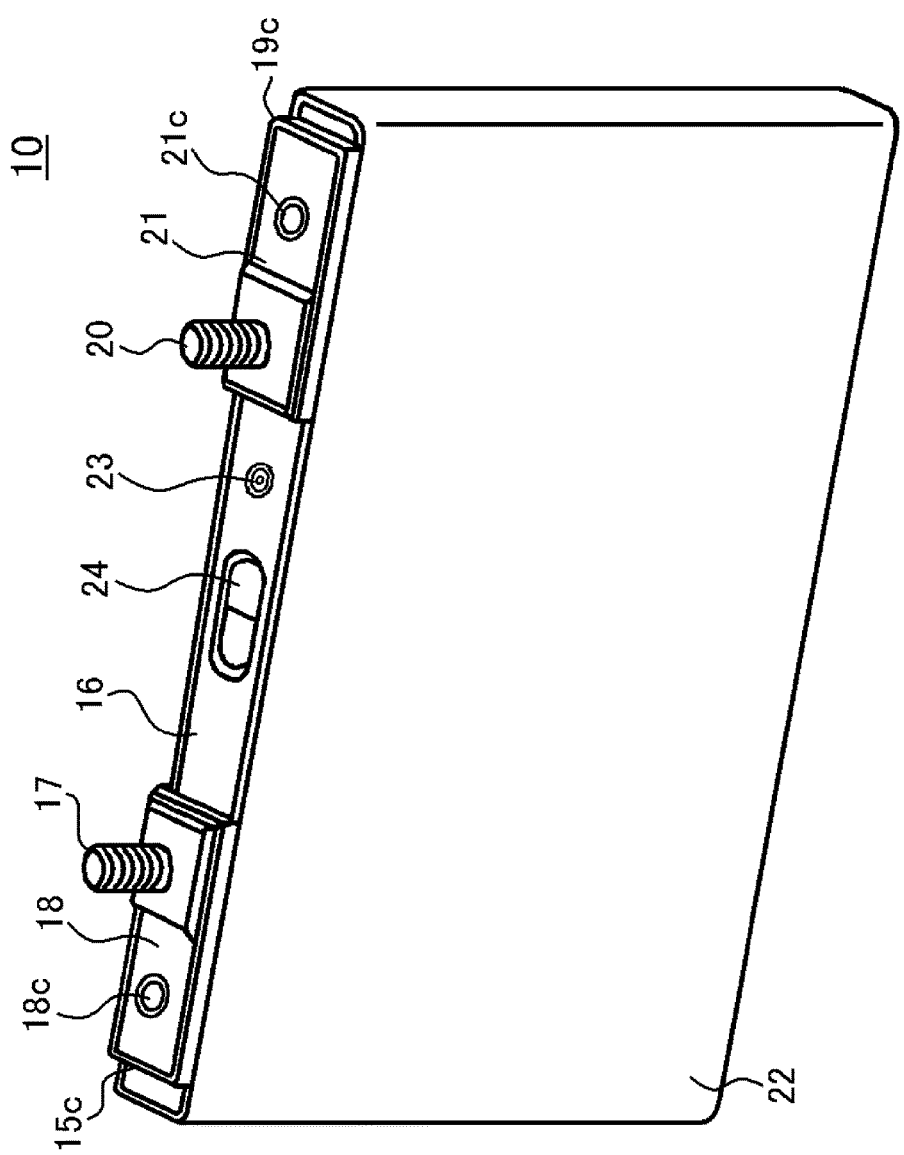
FIG. 1 is a perspective view of a prismatic nonaqueous electrolyte secondary battery of an embodiment.

Hereinafter, a prismatic secondary battery according to an embodiment of the invention is described with reference to drawings. However, referring to the prismatic secondary battery described below, a prismatic nonaqueous electrolyte secondary battery is given as an example of the prismatic secondary battery so that a technical idea of the invention is understood, and the invention is not intended to be limited to the prismatic nonaqueous electrolyte secondary battery. The invention can be equally applied to various modifications such as a prismatic alkaline storage battery without departing from a technical idea described in the scope of claims.

The prismatic secondary battery according to the invention can be applied to an object provided with an electrode assembly including a positive electrode plate and a negative electrode plate. However, an object using a flat winding electrode assembly is representatively described below. In the invention, either a laser beam or an electron beam can be used as a high energy ray which is used for a welding. However, a laser beam is representatively described below. Referring to "up" and "down" in this specification, a direction from a sealing body toward a side of an external conduction member is expressed as "up", and a direction from the sealing body toward a side of an electrode assembly is expressed as "down" based on the sealing body.

EMBODIMENTS

A configuration of a prismatic nonaqueous electrolyte secondary battery 10 of an embodiment is described with reference to FIGS. 1 to 7. The prismatic nonaqueous electrolyte secondary battery 10 includes a flat winding electrode assembly (not illustrated) in which a positive electrode plate (not illustrated) and a negative electrode plate (not illustrated) are winded with a separator interposed therebetween. The positive electrode plate is manufactured by applying a positive active material mixture to both surfaces of a positive electrode substrate including an aluminum foil, and performing a drying and a rolling, and then performing a slitting operation so that the aluminum foil is exposed in a shape of a belt along a longitudinal direction to an edge. In addition, the negative electrode plate is manufactured by applying a negative active material mixture to both surfaces of a negative electrode substrate including a copper foil, and performing a drying and a rolling, and then performing a slitting operation so that the copper foil is exposed in a shape of a belt along a longitudinal direction to an edge.

When the positive electrode plate and the negative electrode plate manufactured as above are winded with a polyethylene microporous separator therebetween by shifting an aluminum foil exposed portion of the positive electrode plate and a copper foil exposed portion of the negative electrode plate so as not to overlap an active material mixture layer of an electrode facing each of the portions, a flat winding electrode assembly including a plurality of positive electrode substrate exposed portions overlapping one another at an end in a winding axial direction, and including a plurality of negative electrode substrate exposed portions overlapping one another at another end is manufactured. The plurality of positive electrode substrate exposed portions are electrically connected to a positive electrode terminal member 12 through a positive electrode collector 11 (see FIGS. 2B and 3), and the plurality of negative electrode substrate exposed portions are electrically connected to a negative electrode terminal member 14 through a negative electrode collector 13 (see FIG. 4B).

The positive electrode terminal member 12 is fixed to a sealing body 16 with a first upper insulating member 15a and a first lower insulating member 15b interposed therebetween. A positive electrode external conduction member 18 provided with a bolt for connection to the outside 17 is fixed onto the positive electrode terminal member 12. The first upper insulating member 15a and the first lower insulating member 15b correspond to an insulating member on a side of a positive electrode in the invention. Similarly, the negative electrode terminal member 14 is fixed to the sealing body 16 with a first upper insulating member 19a and a first lower insulating member 19b interposed therebetween. A negative electrode external conduction member 21 provided with a bolt for connection to the outside 20 is fixed onto the negative electrode terminal member 14.

The prismatic nonaqueous electrolyte secondary battery 10 of the embodiment is manufactured by interposing an insulating resin sheet (not illustrated) around the flat winding electrode assembly manufactured as above excepting a side of the sealing body 16 to be inserted into a prismatic battery outer body 22 (see FIG. 1), and then laser welding the sealing body 16 to an opening of the battery outer body 22, and then injecting a nonaqueous electrolytic solution from a electrolytic solution pouring hole 23, and sealing the electrolytic solution pouring hole 23. The sealing body 16 is further provided with a gas exhaust valve 24 which is opened when a gas pressure higher than an operating pressure of a current cutoff mechanism is applied, and an inside of the battery outer body 22 is sealed.

A pressure sensitive type current cutoff mechanism interposed between the positive electrode collector 11 and the positive electrode terminal member 12, or between the negative electrode collector 13 and the negative electrode terminal member 14 will be described. The current cutoff mechanism may be provided only on a side of a positive electrode, may be provided only on a side of a negative electrode, and may be provided on both sides of the positive electrode and the negative electrode. Therefore, a description is made with reference to FIGS. 2B and 3 on the assumption that the current cutoff mechanism is provided only on the side of the positive electrode.

The positive electrode collector 11 is connected to the positive electrode substrate exposed portions overlapping one another and disposed on a side of a side edge surface of the flat winding electrode assembly, and the positive electrode collector 11 is electrically connected to the positive electrode terminal member 12. The positive electrode terminal member 12 includes a cylindrical portion 12a, and a through hole 12b is formed on an inside. Referring to the positive electrode terminal member 12, the cylindrical portion 12a is inserted into a hole formed in each of a conductive member 25 including a cylindrical portion 25a, the first lower insulating member 15b, the sealing body 16, the first upper insulating member 15a of a gasket and the like, and a tip portion 12c on a lower side thereof is caulked and integrally fixed. Referring to the conductive member 25, the cylindrical portion 25a is formed on a lower side, that is, on a side of the flat winding electrode assembly, and an inner diameter on an upper side, that is, on a side of the sealing body 16 is narrowed to form an opening 25b into which the cylindrical portion 12a of the positive electrode terminal member 12 is inserted.

The tip portion 12c on a lower side of the cylindrical portion 12a of the positive electrode terminal member 12 is caulked near the opening 25b on an upper side of the conductive member 25, and the tip portion 12c of the cylindrical portion 12a of the positive electrode terminal member 12 and a connecting portion of the conductive member 25 are laser welded. In this way, the positive electrode terminal member 12 is electrically insulated from the sealing body 16 by the first upper insulating member 15a and the first lower insulating member 15b, and is electrically connected to the conductive member 25.

A flange portion 25c is formed at a tip on a lower side of the cylindrical portion 25a of the conductive member 25, and a neighborhood of an inversion plate 26 is airtightly welded and sealed on an inner surface side of the flange portion 25c. The inversion plate 26 is formed in a shape protruding downward from a neighborhood toward a center side, that is, a shape having an arrangement relation inclined with respect to the sealing body 16. The inversion plate 26 is formed using an electrically conducting material, and has a function of a valve which is deformed outward, that is, upward when a pressure within the battery outer body 22 increases. In a central part of the inversion plate 26, an inner wall portion of a hole for forming a connecting portion 11b of a thin wall region 11a of the positive electrode collector 11 and a surface of the inversion plate 26 are laser welded in a plurality of places.

A second insulating member 27 including a through hole 27a and formed using a resin material is disposed between the positive electrode collector 11 and the inversion plate 26, and the positive electrode collector 11 and the inversion plate 26 are electrically connected to each other through the through hole 27a. An appropriate number of projections 27b are formed in a neighborhood of the through hole 27a of the second insulating member 27, and the projections 27b are fitted to a hole for fixing 11c formed in the positive electrode collector 11. For example, when an apex of the projections 27b is heated and a diameter thereof is widened, the second insulating member 27 and the positive electrode collector 11 are integrally fixed. The second insulating member 27 and the first lower insulating member 15b are fixed by a latch fixing portion 27c (see FIG. 3).

Therefore, the positive electrode substrate exposed portions are electrically connected to the positive electrode terminal member 12 through the thin wall region 11a of the positive electrode collector 11, the inversion plate 26, and the conductive member 25. A current cutoff mechanism 28 is formed by the cylindrical portion 25a of the conductive member 25, the inversion plate 26, the second insulating member 27, and the thin wall region 11a of the positive electrode collector 11.

The inversion plate 26 is expanded toward the through hole 12b of the positive electrode terminal member 12 when a pressure within the battery outer body 22 increases, and the thin wall region 11a of the positive electrode collector 11 is welded in a central part of the inversion plate 26. Thus, when a pressure within the battery outer body 22 exceeds a predetermined value, a portion of the thin wall region 11a of the positive electrode collector 11 is broken. Therefore, an electrical connection between the inversion plate 26 and the positive electrode collector 11 is cut off.

In a case in which the thin wall region 11a of the positive electrode collector 11 is present, a portion of the thin wall region 11a is easily broken when the inversion plate 26 is deformed, and the portion of the thin wall region 11a is clearly broken when a pressure within the battery increases. Thus, safety of the prismatic nonaqueous electrolyte secondary battery 10 is enhanced. When a thickness and a formed region of the portion of the thin wall region 11a are appropriately set, it is possible to set a pressure at which the portion of the thin wall region 11a is broken to a predetermined value. Thus, reliability is enhanced.

Herein, an example of forming the thin wall region 11a thinner than other portions in an annular shape in a portion around the hole for forming a connecting portion 11b is described. However, the thin wall region 11a may be intermittently formed in an annular shape to surround the hole for forming a connecting portion 11b, and the thin wall region 11a may be formed by setting a thickness of a portion around the hole for forming a connecting portion 11b to the same value as a thickness of other portions, and forming a groove in an annular shape or in an intermittently annular shape. In addition, it is possible to adjust a connection strength of the inversion plate 26 and the positive electrode collector 11 without providing the thin wall region 11a and the groove, and disconnect the inversion plate 26 from the positive electrode collector 11 when the inversion plate 26 is deformed.

The through hole 12b of the positive electrode terminal member 12 is used to test whether the neighborhood of the inversion plate 26 included in the current cutoff mechanism 28 is airtightly welded, and can be used in this state. However, when a corrosive gas and a liquid go into the through hole 12b, and the inversion plate 26 corrodes, there is a concern that the current cutoff mechanism 28 is not normally operated. Thus, it is preferable that the through hole 12b of the positive electrode terminal member 12 be sealed. In the prismatic nonaqueous electrolyte secondary battery 10 of the embodiment, a terminal stopper 29 is fitted to the through hole 12b formed in the positive electrode terminal member 12, and a metal plate 30 including aluminum-based metal is disposed on the terminal stopper 29. It is possible to use, as the terminal stopper 29, an object including an elastic material or a resin material on which a metal plate is not provided.

Subsequently, a specific configuration of the connecting part of the positive electrode terminal member 12 and the positive electrode external conduction member 18 of the prismatic nonaqueous electrolyte secondary battery 10 of the embodiment is described with reference to FIGS. 1 to 3, and FIGS. 5 to 7. A flange portion 12d and a caulked portion 12e are formed in the positive electrode terminal member 12. The caulked portion 12e has a cylindrical shape as a shape before a caulking, has the through hole 12b on an inside, and communicates with the cylindrical portion 12a. Hereinafter, a reference numeral "12e" is applied to a caulked portion before a caulking.

The flange portion 12d is placed on the sealing body 16 in a state in which the flange portion 12d is electrically insulated from the sealing body 16 by the first upper insulating member 15a interposed between the flange portion 12d and the sealing body 16. In this way, a stress applied to the caulked portion 12e can be received by the sealing body 16 through the flange portion 12d when the caulked portion 12e of the positive electrode terminal member 12 undergoes a caulking process. Therefore, it is possible to perform a caulking using a small power when compared to a case in which the flange portion 12d is disposed on an inside of the battery, and it is possible to suppress a stress applied to the positive electrode external conduction member 18, the first upper insulating member 15a, and the first lower insulating member 15b or the like. The positive electrode external conduction member 18 is placed on the flange portion 12d, and a second insulating member 15c is disposed below a neighborhood of the positive electrode external conduction member 18 to ensure an electric insulating performance with respect to the sealing body 16.

A stepped through hole 18a is formed in the positive electrode external conduction member 18. As illustrated in FIGS. 5B and 5C, an upper portion side of the stepped through hole 18a is a large-diameter portion 18b having a larger diameter than a diameter of a lower portion side, the lower portion side is a small-diameter portion 18c having a smaller diameter than a diameter of the upper portion side, and a stepped portion 18d has a flat surface. Convex portions 18e are formed in a plurality of places, for example, in four places with intervals to surround the small-diameter portion 18c of the stepped through hole 18a. Herein, each of the convex portions 18e is formed to radially extend from a center side of the small-diameter portion 18c of the stepped through hole 18a. In addition, an inclined surface 18f is formed at an edge on a side of the small-diameter portion 18c of the stepped through hole 18a of the convex portions 18e.

When the convex portions 18e are formed to radially extend from the center side of the small-diameter portion 18c of the stepped through hole 18a, a rotation preventing effect between the positive electrode external conduction member 18 and the positive electrode terminal member 12 increases. In addition, when the inclined surface 18f is formed at an edge on a side of the small-diameter portion 18c of the stepped through hole 18a of the convex portions 18e, and the caulked portion 12e of the positive electrode terminal member 12 is caulked, an abutting surface of the caulked portion 12e and the convex portions 18e is smoothened. Thus, a stress of the caulked portion 12e is relieved, and a tensile strength is enhanced. Furthermore, a tip side of the positive electrode terminal member 12 is rarely damaged.

A circumferential cross section which is concentric with the stepped through hole 18a of the positive electrode external conduction member 18 of the convex portions 18e can correspond to a quadrangle, a trapezoid, and a triangle, and a corner of the convex portions 18e may be rounded. It is preferable that the convex portions 18e have a height of about 0.1 to 0.2 mm, and a width of about 0.3 to 1.0 mm.

Tapered portions 18g and 18h are formed at respective upper and lower ends of the small-diameter portion 18c of the stepped through hole 18a, and a wall 18j of a stepped portion higher than the convex portions 18e is formed on an outer circumferential side of the convex portions 18e in the large-diameter portion 18b of the stepped through hole 18a. The tapered portions 18g and 18h may not be included. However, when the tapered portions 18g and 18h are provided, a bending angle decreases at the time of performing a caulking process on the caulked portion 12e of the positive electrode terminal member 12. Thus, a stress of the caulked portion 12e is relieved, and a tensile strength is enhanced. Furthermore, a tip side of the positive electrode terminal member 12 is rarely damaged.

A height hp of the wall 18j of the stepped portion (see FIG. 5C) is appropriately selected in a range in which the caulked portion 12e does not protrude than an upper surface of the positive electrode external conduction member 18 after the caulked portion 12e of the positive electrode terminal member 12 is caulked. In this way, since the caulked portion 12e of the positive electrode terminal member 12 does not protrude upward from the positive electrode external conduction member 18, it is possible to suppress the positive electrode terminal member 12 from being damaged due to a tool and the like touching the positive electrode terminal member 12.

The convex portions 18e are formed from a side of the small-diameter portion 18c of the stepped through hole 18a formed in the positive electrode external conduction member 18 up to the wall 18j of the stepped portion. When this configuration is adopted, the convex portions 18e are prevented from being deformed. In addition, the convex portions 18e are easily exposed between the caulked portion 12e of the positive electrode terminal member 12 and the wall 18j of the stepped portion, a position of the convex portions 18e can be verified, and a boundary of the convex portions 18e and the caulked portion 12e can be accurately welded when a laser welding is performed.

The bolt 17 is vertically arranged in a position where the stepped through hole 18a is not formed in the positive electrode external conduction member 18. The bolt 17 is provide to fix a wire for connection to the outside and a bus bar (not illustrated) for connecting a plurality of prismatic nonaqueous electrolyte secondary batteries 10 to each other in series, in parallel, or in series-parallel. The caulked portion 12e having a cylindrical shape of the positive electrode terminal member 12 is inserted from a side of the small-diameter portion 18c of the stepped through hole 18a of the positive electrode external conduction member 18, and a lower surface of the positive electrode external conduction member 18 is placed on the flange portion 12d of the positive electrode terminal member 12. In this state, the caulked portion 12e having a cylindrical shape of the positive electrode terminal member 12 is caulked, and the positive electrode external conduction member 18 and the positive electrode terminal member 12 are strongly fixed.

Figure 7:
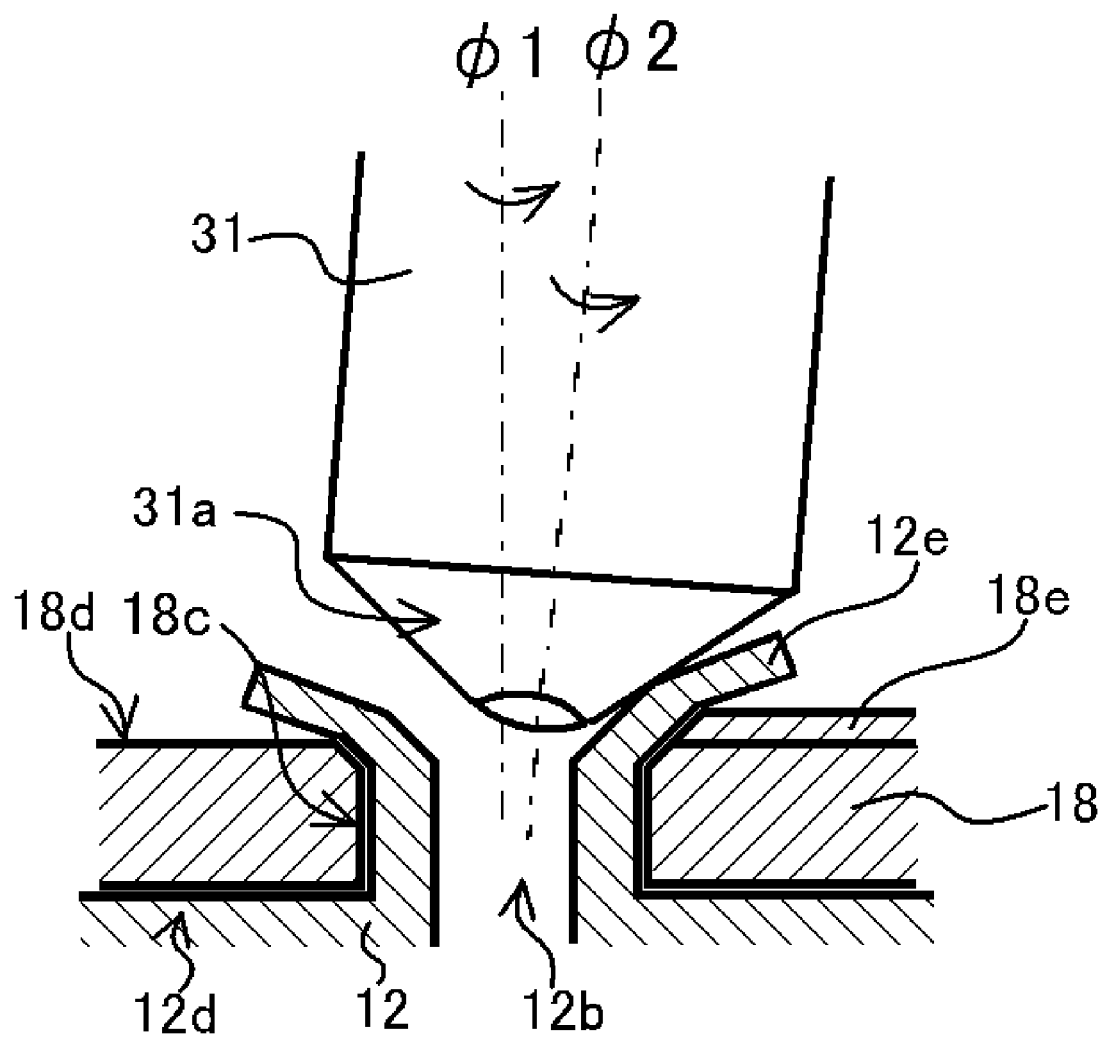
FIG. 7 is a cross-sectional view illustrating a state in which a connecting portion of a positive electrode terminal member is caulked and fixed to a positive electrode external conduction member by a spinning caulking.

The caulked portion 12e of the positive electrode terminal member 12 is fixed to the positive electrode external conduction member 18 by a spinning caulking as below. First, when the caulked portion 12e having a cylindrical shape of the positive electrode terminal member 12 is inserted into the stepped through hole 18a of the positive electrode external conduction member 18 from a side of the small-diameter portion 18c, a state illustrated in FIGS. 6A and 6B is obtained. In this state, a spinning caulking is performed so that a diameter of the caulked portion 12e having a cylindrical shape increases from an upper side using a spinning caulking jig 31 as illustrated in FIG. 7.

The spinning caulking jig 31 is processed so that a diameter of a tip portion 31a decreases, and is driven to rotate around a central axis $\phi 1$ of the caulked portion 12e having a cylindrical shape while rotating around an eccentric axis φ2 with respect to the central axis φ1 of the caulked portion 12*e* having a cylindrical shape. In this way, a diameter on the tip side of the caulked portion 12*e* having a cylindrical shape increases, and the caulked portion 12*e* is fixed by a caulking without a gap onto a surface of the stepped portion 18*d* and the tapered portion 18*g* on an upper side of the positive electrode external conduction member 18. This state is illustrated in FIGS. 6C and 6D.

According to the spinning caulking, the tip side of the caulked portion 12*e* having a cylindrical shape of the positive electrode terminal member 12 can be strongly fixed by a caulking to the stepped portion 18*d* and the tapered portion 18*g* on an upper side of the positive electrode external conduction member 18 without applying a great force. Thus, a great force is not applied to the sealing body 16, the first upper insulating member 15*a*, the first lower insulating member 15*b*, and the current cutoff mechanism 28, which are rarely deformed or damaged.

Since the positive electrode external conduction member 18 is placed on the flange portion 12*d* of the positive electrode terminal member 12, the positive electrode external conduction member 18 can be stably placed on the flange portion 12*d* of the positive electrode terminal member 12. For this reason, even when a shape of the caulked portion 12*e* partly varies, a gap is not formed between the caulked portion 12*e*, and the stepped portion 18*d* and the tapered portion 18*g* on an upper side of the positive electrode external conduction member 18 when an upper edge of the positive electrode terminal member 12 is caulked. Further, since heat due to a laser welding to be described below is rarely transferred to the first upper insulating member 15*a* and the first lower insulating member 15*b* disposed between the positive electrode terminal member 12 and the sealing body 16, it is possible to suppress deterioration of a sealing property due to the first upper insulating member 15*a* and the first lower insulating member 15*b*.

Since the convex portions 18*e* are formed to radially extend from the center side of the stepped through hole 18*a* in the stepped portion 18*d* of the positive electrode external conduction member 18, the convex portions 18*e* invade the caulked portion 12*e* in a broader region. Thus, the positive electrode external conduction member 18 and the positive electrode terminal member 12 are strongly fixed so as to rarely rotate.

Furthermore, as illustrated in FIGS. 6E and 6F, in the prismatic nonaqueous electrolyte secondary battery 10 of the embodiment, a laser welding is performed in a plurality of places where the convex portions 18*e* are not formed between the tip side of the caulked portion 12*e* of the positive electrode terminal member 12 and the stepped portion 18*d* of the positive electrode external conduction member 18, and welding spots 32 are formed in a plurality of evenly spaced places. A formation state of the welding spots 32 will be described in detail below.

Subsequently, specific configurations of a junction between the negative electrode collector 13 and the negative electrode terminal member 14, and a junction between the negative electrode terminal member 14 and the negative electrode external conduction member 21 are described with reference to FIG. 4. However, a specific configuration of the negative electrode collector 13 is substantially the same as a configuration of the positive electrode collector 11 except that a formation material includes copper-based metal. Thus, a specific description thereof is not provided. A pressure sensitive type current cutoff mechanism is not formed on a side of a negative electrode. For this reason, the negative electrode terminal member 14 is fixed to the sealing body 16 while being electrically insulated from the sealing body 16 by the first upper insulating member 19*a* and the first lower insulating member 19*b*.

A hole for forming a connecting portion 13*c* is formed in the negative electrode collector 13, and a tip portion 14*c* of a cylindrical portion 14*a* on a lower side of the negative electrode terminal member 14 is inserted into the hole for forming a connecting portion 13*c*, and then a caulking and a fixing is performed to integrally join the negative electrode collector 13 and the negative electrode terminal member 14 to each other. Furthermore, a connecting portion of the negative electrode collector 13 and the tip portion 14*c* of the cylindrical portion 14*a* on a lower side of the negative electrode terminal member 14 is laser welded.

In addition, a flange portion 14*d* and a caulked portion 14*e* are formed in the negative electrode terminal member 14. The caulked portion 14*e* has a cylindrical shape as a shape before a caulking, and is not provided with the pressure sensitive type current cutoff mechanism on a side of a negative electrode unlike the positive electrode terminal member 12. Therefore, a through hole is not formed, and an inside has a bottomed hole 14*b*. Hereinafter, a description is made by applying a reference numeral "14*e*" to a caulked portion before a caulking. The negative electrode external conduction member 21 is placed on the flange portion 14*d* of the negative electrode terminal member 14, and a second insulating member 19*c* is disposed below a neighborhood of the negative elesubstratectrode external conduction member 21 to ensure an electric insulating performance with respect to the sealing body 16.

Figure 4A:
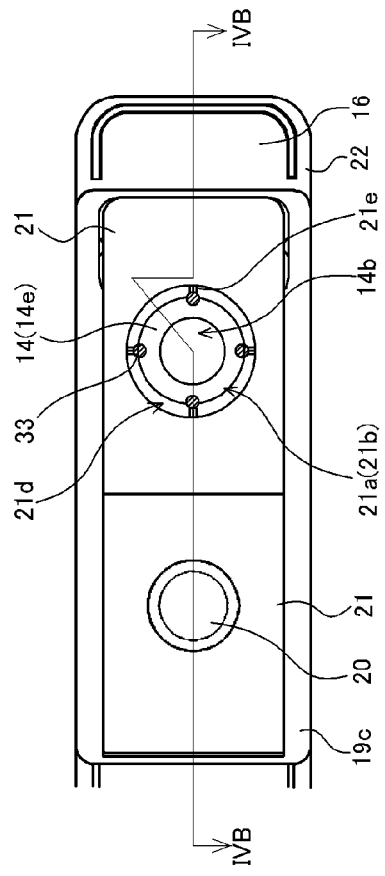
FIG. 4A is a plan view on a side of a negative electrode of the prismatic nonaqueous electrolyte secondary battery illustrated in FIG. 1.
Figure 4B:
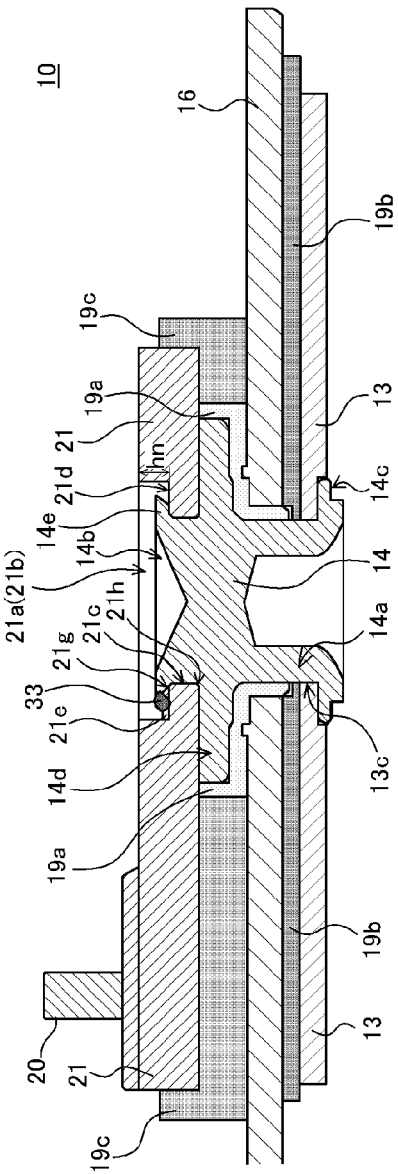
FIG. 4B is an enlarged sectional view taken along line IVB-IVB of FIG. 4A.

A stepped through hole 21*a* is formed in the negative electrode external conduction member 21. As illustrated in FIGS. 4A and 4B, an upper portion side of the stepped through hole 21*a* is a large-diameter portion 21*b* having a larger diameter than a diameter of a lower portion side, the lower portion side is a small-diameter portion 21*c* having a smaller diameter than a diameter of the upper portion side, and a stepped portion 21*d* has a flat surface. Convex portions 21*e* are formed in a plurality of places, for example, in four places with intervals to surround the small-diameter portion 21*c* of the stepped through hole 21*a*. Herein, each of the convex portions 21*e* is formed to radially extend from a center side of the small-diameter portion 21*c* of the stepped through hole 21*a*. In addition, an inclined surface (not illustrated) is formed at an edge on a side of the small-diameter portion 21*c* of the stepped through hole 21*a* of the convex portions 21*e*. A circumferential cross section which is concentric with the stepped through hole 21*a* of the negative electrode external conduction member 21 of the convex portions 21*e* may correspond to a quadrangle, a trapezoid, and a triangle, and a corner of the convex portions 21*e* may be rounded. It is preferable that the convex portions 21*e* have a height of about 0.1 to 0.2 mm, and a width of about 0.3 to 1.0 mm.

Tapered portions 21*g* and 21*h* are formed at respective upper and lower ends of the small-diameter portion 21*c* of the stepped through hole 21*a*, and a wall 21*j* of a stepped portion higher than the convex portions 21*e* is formed on an outer circumferential side of the convex portions 21*e* in the large-diameter portion 21*b* of the stepped through hole 21*a*. A height hn of the wall 21*j* of the stepped portion (see FIG. 4B) is appropriately selected in a range in which the caulked portion 14*e* does not protrude more than an upper surface of the negative electrode external conduction member 21 after the caulked portion 14*e* of the negative electrode terminal member 14 is caulked. The tapered portions 21*g* and 21*h* may not be included. However, when the tapered portions 21g and 21h are provided, a bending angle decreases at the time of performing a caulking process on the caulked portion 14e of the negative electrode terminal member 14. Thus, a tip side of the negative electrode terminal member 14 is rarely damaged.

The bolt 20 is vertically arranged in a position where the stepped through hole 21a is not formed in the negative electrode external conduction member 21. Similarly to the positive electrode external conduction member 18, the bolt 20 is provide to fix a wire and the like for connection to the outside and a bus bar for connecting a plurality of prismatic nonaqueous electrolyte secondary batteries 10 to each other in series, in parallel, or in series-parallel.

The caulked portion 14e having a cylindrical shape of the negative electrode terminal member 14 is inserted from a side of the small-diameter portion 21c of the stepped through hole 21a of the negative electrode external conduction member 21, and a lower surface of the negative electrode external conduction member 21 is placed on the flange portion 14d of the negative electrode terminal member 14. In this state, the caulked portion 14e having a cylindrical shape of the negative electrode terminal member 14 is caulked, and the negative electrode external conduction member 21 and the negative electrode terminal member 14 are strongly fixed.

The caulked portion 14e of the negative electrode terminal member 14 is fixed to the negative electrode external conduction member 21 by spinning caulking. A laser welding is performed in a plurality of places where the convex portions 21e are formed between the tip side of the caulked portion 14e of the negative electrode terminal member 14 and the stepped portion 21d of the negative electrode external conduction member 21, and welding spots 33 are formed in a plurality of evenly spaced places. A formation state of the welding spots 33 is described in detail below together with a formation state of the welding spots 32 on a side of the positive electrode.

On a side of the negative electrode, since the negative electrode external conduction member 21 is placed on the flange portion 14d of the negative electrode terminal member 14, the negative electrode external conduction member 21 can be stably placed on the flange portion 14d of the negative electrode terminal member 14. Therefore, even when a shape of the caulked portion 14e partly varies, a gap is not formed between the caulked portion 14e, and the stepped portion 21d of the negative electrode external conduction member 21 when an upper edge of the negative electrode terminal member 14 is caulked. Further, since heat due to a laser welding described below is rarely transferred to the first upper insulating member 19a and the first lower insulating member 19b disposed between the negative electrode terminal member 14 and the sealing body 16, it is possible to suppress deterioration of a sealing property due to the first upper insulating member 19a and the first lower insulating member 19b.

Since the convex portions 21e are formed to radially extend from a side of the stepped through hole 21a in the stepped portion 21d of the negative electrode external conduction member 21, the convex portions 21e invade the caulked portion 14e in a broader region. Thus, the negative electrode external conduction member 21 and the negative electrode terminal member 14 are strongly fixed so as to rarely rotate.

In a nonaqueous electrolyte secondary battery, since aluminum-based metal is generally used as a substrate of a positive electrode plate, corrosion due to a contact between dissimilar metals is inhibited. Therefore, it is preferable that a material including aluminum-based metal be used as the positive electrode collector, the pressure sensitive type current cutoff mechanism 28, the positive electrode terminal member 12, and the positive electrode external conduction member 18 of the prismatic nonaqueous electrolyte secondary battery 10. Similarly, since copper-based metal is generally used as a substrate of the negative electrode plate, it is preferable that a material including copper-based metal be used as the negative electrode collector 13, the negative electrode terminal member 14, and the negative electrode external conduction member 21 of the prismatic nonaqueous electrolyte secondary battery 10. Referring to the material including aluminum-based metal and the material including copper-based metal, aluminum-based metal and copper-based metal may be included as main constituents, respectively, and a surface includes a material covered with dissimilar metal such as nickel.

A stress due to a caulking process remains in the caulked portion 12e of the positive electrode terminal member 12 and the caulked portion 14e of the negative electrode terminal member 14. As the stress increases, strength of the caulked portion increases and thus, a vibration resistance is enhanced. Therefore, a stress due to a caulking process cannot be completely excluded. When a tip side of the caulked portions 12e and 14e of the positive electrode terminal member 12 or the negative electrode terminal member 14, and the positive electrode external conduction member 18 or the negative electrode external conduction member 21 are laser welded, a welding fused portion is formed. The welding fused portion is cooled down to form the welding spots 32 and 33.

Figure 2A:
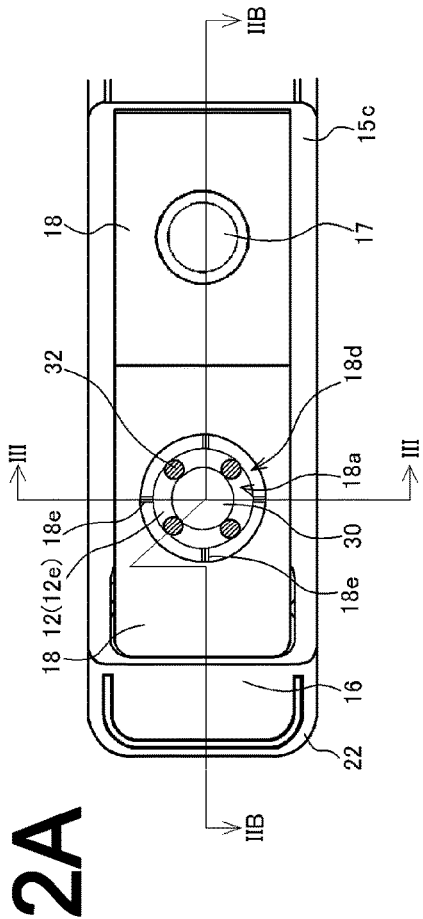
FIG. 2A is a plan view on a side of a positive electrode of the prismatic nonaqueous electrolyte secondary battery illustrated in FIG. 1.
Figure 2B:
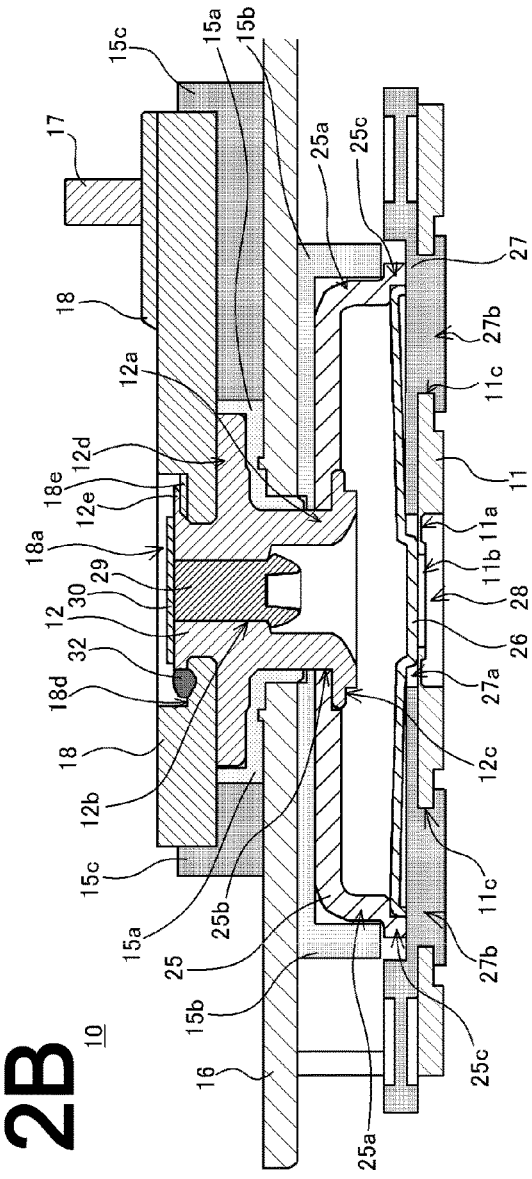
FIG. 2B is an enlarged sectional view taken along line IIB-IIB of FIG. 2A.
Figure 3:
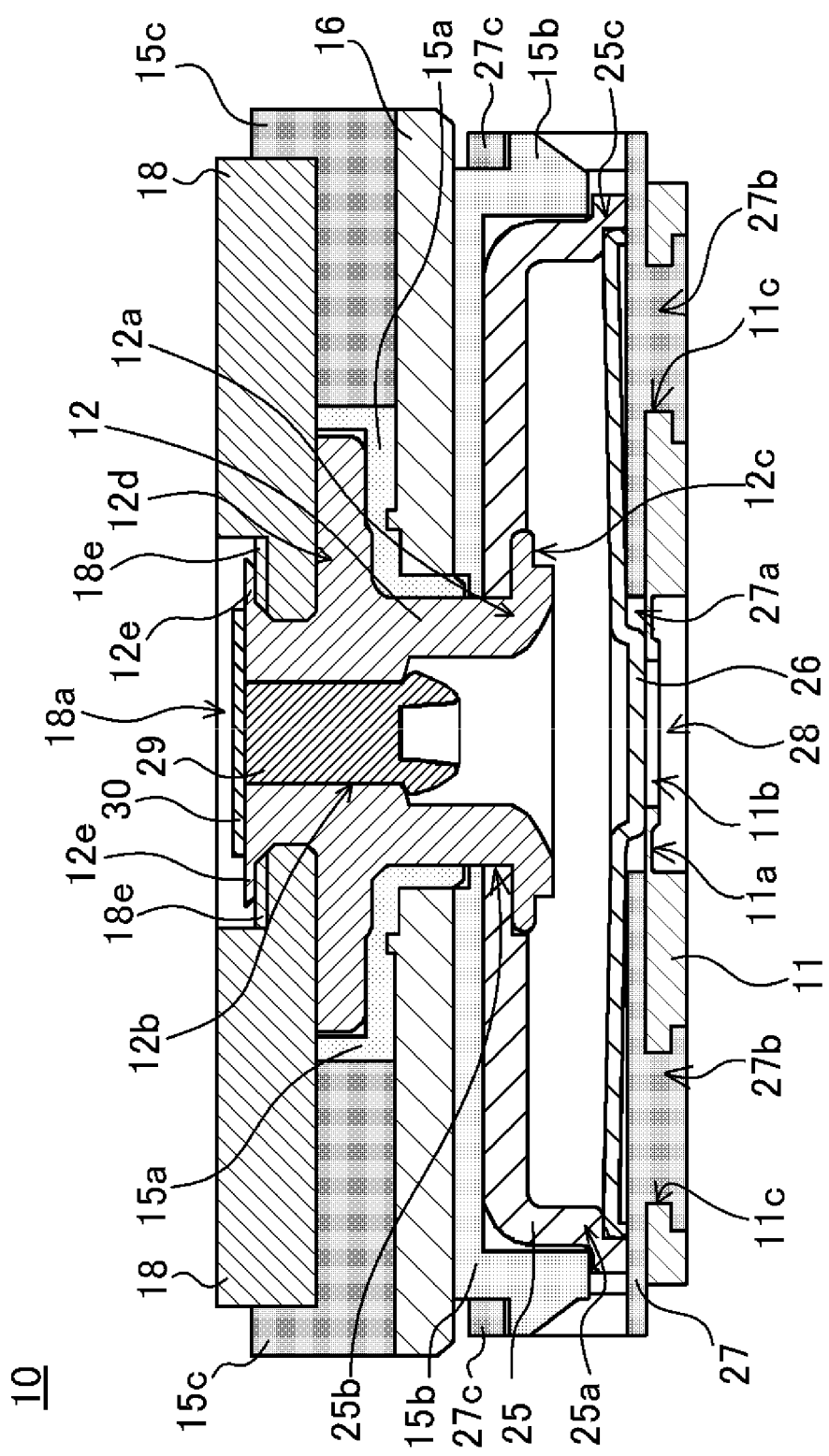
FIG. 3 is an enlarged sectional view taken along line III-III of FIG. 2A.

There is a concern that a strength is insufficient only with fixing by caulking on a side of the positive electrode using aluminum-based metal. However, it is possible to ensure a sufficient joint strength and an excellent electrical continuity even when a lot of vibrations are included by forming the large welding spots 32 in addition to the fixing by caulking. Furthermore, when the welding spots 32 on a side of the positive electrode are formed in a place where the convex portions 18e of the positive electrode external conduction member 18 are not formed, it is possible to prevent a rotation stopping effect from deteriorating due to the convex portions 18e melted. In addition, when a thick portion is welded in the caulked portion 12e, a high weld strength is obtained. For this reason, as illustrated in FIG. 2A, it is preferable that the welding spots 32 on a side of the positive electrode be formed in a place where the convex portions 18e of the positive electrode external conduction member 18 are not formed.

A sufficient strength can be obtained only with fixing by caulking on a side of the negative electrode using copper-based metal. However, it is possible to ensure a strength and an excellent electrical continuity by forming the welding spots 33 smaller than the welding spots 32 on a side of the positive electrode in addition to the fixing by caulking. The copper-based metal uses larger energy during a welding when compared to the aluminum-based metal and thus, a sputtering, a crack, and the like are easily generated.

For this reason, it is preferable that a diameter of the welding spots 33 on a side of the negative electrode be set to a smaller value than a diameter of the welding spots 32 on a side of the positive electrode, and the welding spots 33 be formed in a place where the convex portions 21e of the negative electrode external conduction member 21 are formed. When this configuration is adopted, the caulked portion 14e of the negative electrode terminal member 14 positioned on the convex portions 21e is thinner than other portions, and the welding fused portion can be formed only in a portion of the convex portions 21e. Therefore, a sputtering, a crack, and the like are rarely generated, and homogeneous welding spots 33 can be formed.

Modified Examples 1 to 3

In the prismatic nonaqueous electrolyte secondary battery 10 of the embodiment, an example, in which the convex portions 18e of the positive electrode external conduction member 18 and the convex portions 21e of the negative electrode external conduction member 21 are extended from the center sides of the small-diameter portions 18c and 21c of the stepped through holes 18a and 21a up to the walls 18j and 21j of the stepped portions, is described. In the invention, the convex portions 18e and 21e cannot be extended from the center sides of the small-diameter portions 18c and 21c of the stepped through holes 18a and 21a up to the walls 18j and 21j of the stepped portions when a rotation between the positive electrode external conduction member 18 and the positive electrode terminal member 12, and a rotation between the negative electrode external conduction member 21 and the negative electrode terminal member 14 may be inhibited.

Modified Examples of the convex portions 18e of the positive electrode external conduction member 18 and the convex portions 21e of the negative electrode external conduction member 21 are described with reference to FIGS. 8A to 8F. In FIGS. 8A to 8F, a side of the positive electrode and a side of the negative electrode can employ similar configurations. Hereinafter, a side of the positive electrode is representatively described, and a detailed description of a side of the negative electrode is not provided.

A convex portion 18e of a positive electrode external conduction member 18 of Modified Example 1 is formed between a position separated from a small-diameter portion 18c of a stepped through hole 18a and a position not reaching a wall 18j of a stepped portion on a stepped portion 18d of the positive electrode external conduction member 18. In this state, when a caulked portion 12e of a positive electrode terminal member 12 is fixed by caulking, the entire convex portion 18e is covered with the caulked portion 12e as illustrated in FIG. 8A. A junction of the positive electrode external conduction member 18 and the positive electrode terminal member 12 of Modified Example 1 rarely rotates due to a presence of the convex portion 18e.

A convex portion 18e of a positive electrode external conduction member 18 of Modified Example 2 is formed between a side of a small-diameter portion 18c of a stepped through hole 18a and a position not reaching a wall 18j of a stepped portion on a stepped portion 18d of the positive electrode external conduction member 18. In this state, when a caulked portion 12e of a positive electrode terminal member 12 is fixed by caulking, a portion of the convex portion 18e is covered with the caulked portion 12e as illustrated in FIG. 8B. A junction of the positive electrode external conduction member 18 and the positive electrode terminal member 12 of Modified Example 2 rarely rotates due to a presence of the convex portion 18e.

A convex portion 18e of a positive electrode external conduction member 18 of Modified Example 3 is provided on a tapered portion 18g which is formed on an upper side of a small-diameter portion 18c of a stepped through hole 18a of the positive electrode external conduction member 18, and a convex portion is not formed on a stepped portion 18d. In this state, when a caulked portion 12e of a positive electrode terminal member 12 is fixed by caulking, the entire convex portion 18e is covered with the caulked portion 12e as illustrated in FIG. 8C. A junction of the positive electrode external conduction member 18 and the positive electrode terminal member 12 of Modified Example 3 rarely rotates due to a presence of the convex portion 18e.

It is preferable that a laser welding between the positive electrode external conduction member 18 and the positive electrode terminal member 12 in Modified Examples 1 to 3 be performed in a place where the convex portion 18e is not formed on the positive electrode external conduction member 18 as illustrated in FIGS. 2A and 2B, and FIGS. 6A to 6F. However, the laser welding may be performed in a place where the convex portion 18e is formed. In this case, for example, a welding spot may have a larger diameter when compared to the welding spots 32 having a shape illustrated in FIGS. 8D, 8E, and 8F.

In the prismatic nonaqueous electrolyte secondary battery 10 of the embodiment, an example in which the convex portions 18e or 21e are provided on the positive electrode external conduction member 18 and the negative electrode external conduction member 21, respectively is described. However, the convex portions 18e or 21e may be provided on one of the positive electrode external conduction member 18 and the negative electrode external conduction member 21. Similarly, the positive electrode terminal member 12 and the negative electrode terminal member 14, and the positive electrode external conduction member 18 and the negative electrode external conduction member 21 may be joined to each other using both a fixing by caulking and a laser welding. However, only the fixing by caulking may be used.

In the prismatic nonaqueous electrolyte secondary battery 10 of the embodiment, an example of using a stepped through hole including a large-diameter portion and a small-diameter portion as a through hole formed in an external terminal board as an external conduction member is described. However, a simple through hole excluding a stepped portion can be used.

In the prismatic nonaqueous electrolyte secondary battery 10 of the embodiment, an example in which an external conduction member corresponds to an external terminal board is illustrated. However, a bus bar that connects adjacent terminals of a prismatic secondary battery to each other in an assembled battery may correspond to the external conduction member. For example, without using the external terminal board, a positive electrode terminal member of a prismatic secondary battery may be connected to an end side of a bus bar, a negative electrode terminal member of an adjacent prismatic secondary battery may be connected to another end side of the bus bar, and the invention may be applied to a connecting portion of the positive electrode terminal member and the bus bar, or a connecting portion of the negative electrode terminal member and the bus bar.

In the prismatic nonaqueous electrolyte secondary battery 10 of the embodiment, it is possible to use a member in which a connecting portion is formed on a surface side of a flange portion as a terminal member, dispose the flange portion within a battery of a sealing body, and cause the connecting portion to pass through a through hole of the sealing body, and be inserted into a through hole of an external conduction member.

In the prismatic nonaqueous electrolyte secondary battery 10 of the embodiment, a plurality of convex portions are provided with intervals around a through hole of an external conduction member, and the convex portions are covered with a caulked portion of a terminal member. However, a convex portion may be provided around a through hole of an external conduction member, and the convex portion may be covered with a caulked portion of a terminal member. In this way, it is possible to prevent the external conduction member from rotating with respect to the terminal member. However, in this case, the convex portion is a convex portion having a non-annular shape in plan view rather than a convex projection having an annular shape formed to surround a through hole.

In the prismatic nonaqueous electrolyte secondary battery 10 of the embodiment, an example in which each of the positive electrode terminal member 12 and the negative electrode terminal member 14 is insulated by the sealing body 16 and the insulating member is described. However, one of the positive electrode terminal member 12 and the negative electrode terminal member 14 may be electrically connected to the sealing body 16. However, it is preferable that each of the positive electrode terminal member 12 and the negative electrode terminal member 14 be insulated by the sealing body 16 and the insulating member.

In the invention, a convex portion is provided around a through hole of an external conduction member, and the convex portion is covered with a caulked portion of a terminal member. However, a concave portion may be provided around the through hole of the external conduction member, and the external conduction member may prevent a rotation with respect to the terminal member. In this case, it is preferable that the concave portion be formed to extend in a direction away from the through hole. In addition, it is preferable that a plurality of concave portions be provided with intervals. In particular, it is preferable that the concave portion be radially provided from the through hole.

What is claimed is:

1. A prismatic secondary battery comprising:
an electrode assembly including a positive electrode plate and a negative electrode plate;
an outer body including an opening, and accommodating the electrode assembly;
a sealing body including a through hole, and sealing the opening;
an external conduction member including the through hole, and placed outside the sealing body; and
a terminal member electrically connected to the positive electrode plate or the negative electrode plate, and passing through the through hole of the sealing body, wherein
the terminal member includes a connecting portion,
the connecting portion of the terminal member is inserted into the through hole of the external conduction member, and includes a tip caulked on the external conduction member,
the external conduction member includes a convex portion for suppressing a rotation formed in a position facing the caulked connecting portion of the terminal member, and
an upper end in a height direction of the convex portion is covered with the caulked portion.

2. The prismatic secondary battery according to claim 1, wherein
the convex portion for suppressing a rotation includes a plurality of convex portions formed with intervals, and
each of the plurality of convex portions has a linear shape and extends in a radial direction away from a center side of the through hole of the external conduction member.

3. The prismatic secondary battery according to claim 1, wherein
the caulked portion of the terminal member and the external conduction member are welded,
the external conduction member is connected to the caulked portion of the terminal member at a part where the convex portion is not formed by welding with a welding spot, and
the welding spot is formed apart from the convex portion.

4. The prismatic secondary battery according to claim 1, wherein
the convex portion includes a region which is not covered with the caulked portion, and
a region of the convex portion which is covered with the caulked portion has an area greater than an area of the region which is not covered with the caulked portion.

5. The prismatic secondary battery according to claim 1, wherein
a circumferential cross section which is concentric with the through hole of the external conduction member in the convex portion corresponds to a quadrangle, a trapezoid, or a triangle, and
the circumferential cross section has at least two sides that are covered with the caulked portion of the terminal member.

6. The prismatic secondary battery according to claim 1, wherein
the through hole formed in the external conduction member has a small-diameter portion and a large-diameter portion having a larger diameter than the small-diameter portion,
the large-diameter portion is formed at a upper position than the small-diameter portion,
the through hole formed in the external conduction member includes
a first side wall that constitutes the small-diameter portion,
a second side wall that constitutes the large-diameter portion, and
a bottom that extends between the first side wall and the second side wall in a substantially horizontal direction,
the convex portion is formed on the bottom,
the upper end of the convex portion is located at a position lower than an upper end of the second side wall, and
an upper end of the caulked portion is located at a position higher than the upper end of the convex portion and lower than the upper end of the second side wall.

7. The prismatic secondary battery according to claim 1, wherein that the whole of the convex portion is covered with the caulked portion of the terminal member.

8. A prismatic secondary battery comprising:
an electrode assembly including a positive electrode plate and a negative electrode plate;
an outer body including an opening, and accommodating the electrode assembly;
a sealing body including a through hole, and sealing the opening;
an external conduction member including the through hole, and placed outside the sealing body; and
a terminal member electrically connected to the positive electrode plate or the negative electrode plate, and passing through the through hole of the sealing body, wherein
the terminal member includes a connecting portion,
the connecting portion of the terminal member is inserted into the through hole of the external conduction member, and includes a tip caulked on the external conduction member, the external conduction member includes a convex portion for suppressing a rotation formed in a position facing the caulked connecting portion of the terminal member,
at least a portion of the convex portion is covered with the caulked portion, and
the maximum thickness of the caulked portion is greater than the maximum height of a part of the convex portion which is covered with the caulked portion in a direction perpendicular to the sealing body.

9. The prismatic secondary battery according to claim 8, wherein a region of the convex portion which is covered with the caulked portion has an area greater than an area of a region which is not covered with the caulked portion.

10. The prismatic secondary battery according to claim 8, wherein
the external conduction member is connected to the caulked portion of the terminal member at a part where the convex portion is not formed by welding with a welding spot, and
the welding spot is formed apart from the convex portion.

11. The prismatic secondary battery according to claim 8, wherein
the convex portion includes a plurality of convex portions formed with intervals, and
each of the plurality of convex portions has a linear shape and extends in a radial direction away from a center side of the though hole of the external conduction member.

12. The prismatic secondary battery according to claim 8, wherein
the trough hole formed in the external conduction member has a small-diameter portion and a large-diameter portion having a larger diameter than the small-diameter portion,
the large-diameter portion is formed at a upper position than the small-diameter portion,
the through hole formed in the external conduction member includes
a first side wall that constitutes the small-diameter portion,
a second side wall that constitutes the large-diameter portion, and
a bottom that extends between the first side wall and the second side wall in a substantially horizontal direction,
the convex portion is formed on the bottom,
the upper end of the convex portion is located at a position lower than an upper end of the second side wall, and
an upper end of the caulked portion is located at a position higher than the upper end of the convex portion and lower than the upper end of the second side wall.

13. The prismatic secondary battery according to claim 12, wherein the convex portion is in contact with the second side wall.

14. The prismatic secondary battery according to claim 12, wherein a tapered portion is formed between the first side wall and the bottom.

15. A prismatic secondary battery comprising:
an electrode assembly including a positive electrode plate and a negative electrode plate;
an outer body including an opening, and accommodating the electrode assembly;
a sealing body including a through hole, and sealing the opening;
an external conduction member including the through hole, and placed outside the sealing body; and
a terminal member electrically connected to the positive electrode plate or the negative electrode plate, and passing through the through hole of the sealing body, wherein
the terminal member includes a connecting portion,
the connecting portion of the terminal member is inserted into the through hole of the external conduction member, and includes a tip caulked on the external conduction member,
the external conduction member includes a convex portion for suppressing a rotation formed in a position facing the caulked connecting portion of the terminal member,
at least a portion of the convex portion is covered with the caulked portion, and
a region of the convex portion which is covered with the caulked portion has an area greater than an area of a region which is not covered with the caulked portion.

16. The prismatic secondary battery according to claim 15, wherein
the external conduction member is connected to the caulked portion of the terminal member at a part where the convex portion is not formed by welding with a welding spot, and
the welding spot is formed apart from the convex portion.

17. The prismatic secondary battery according to claim 15, wherein
the trough hole formed in the external conduction member has a small-diameter portion and a large-diameter portion having a larger diameter than the small-diameter portion,
the large-diameter portion is formed at a upper position than the small-diameter portion,
the through hole formed in the external conduction member includes
a first side wall that constitutes the small-diameter portion,
a second side wall that constitutes the large-diameter portion, and
a bottom that extends between the first side wall and the second side wall in a substantially horizontal direction,
the convex portion is formed on the bottom,
the upper end of the convex portion is located at a position lower than an upper end of the second side wall, and
an upper end of the caulked portion is located at a position higher than the upper end of the convex portion and lower than the upper end of the second side wall.

18. The prismatic secondary battery according to claim 17, wherein the convex portion is in contact with the second side wall.

19. The prismatic secondary battery according to claim 15, wherein
the convex portion includes a first side surface and a second side surface being different each other,
each of the first side surface and the second side surface intersects a straight line that is perpendicular to a radial direction of the through hole formed in the external conduction member and is perpendicular to a height direction of the convex portion, and
the caulked portion covers an upper end of the convex portion, the first side surface of the convex portion, and the second side surface of the convex portion.

20. The prismatic secondary battery according to claim 15, wherein
the convex portion includes a plurality of convex portions formed with intervals, and each of the plurality of convex portions has a linear shape and extends in a radial direction away from a center side of the though hole of the external conduction member.

* * * * *